United States Patent
Funder et al.

(10) Patent No.: US 9,168,901 B2
(45) Date of Patent: Oct. 27, 2015

(54) ELECTRIC STABILITY CONTROL SYSTEM AND DEVICE FOR CONTROLLING SWAY STABILITY OF A CARAVAN OR TRAILER AND THE LIKE

(75) Inventors: Robert Funder, Melbourne (AU); Simon Cox, Dandenong South (AU)

(73) Assignee: AL-KO International Pty Ltd., Dandenong, South Victoria (AU)

( * ) Notice: Subject to any disclaimer, the term of this patent is extended or adjusted under 35 U.S.C. 154(b) by 261 days.

(21) Appl. No.: 13/581,295

(22) PCT Filed: Mar. 8, 2012

(86) PCT No.: PCT/AU2012/000239
§ 371 (c)(1),
(2), (4) Date: Jan. 25, 2013

(87) PCT Pub. No.: WO2012/119199
PCT Pub. Date: Sep. 13, 2012

(65) Prior Publication Data
US 2013/0124059 A1 May 16, 2013

(30) Foreign Application Priority Data

Mar. 8, 2011 (AU) .................................. 2011900817
May 25, 2011 (AU) .................................. 2011902032

(51) Int. Cl.
*B60T 8/24* (2006.01)
*B60T 7/20* (2006.01)
(Continued)

(52) U.S. Cl.
CPC ... *B60T 7/20* (2013.01); *B60D 1/30* (2013.01); *B60D 1/62* (2013.01); *B60T 8/1708* (2013.01); *B60T 8/1755* (2013.01); *B60T 8/248* (2013.01); *B60T 2230/06* (2013.01)

(58) Field of Classification Search
CPC ..... B60T 8/248; B60T 8/1708; B60T 8/1755; B60T 7/20; B60T 2230/06; B60D 1/30; B60D 1/62

USPC .......................................................... 701/70
See application file for complete search history.

(56) References Cited

U.S. PATENT DOCUMENTS

| 3,758,165 A | 9/1973 | Savelli |
| 3,948,544 A | 4/1976 | Presley et al. |

(Continued)

FOREIGN PATENT DOCUMENTS

| DE | 10215617 A1 | 11/2003 | |
| GB | 1514965 A | 6/1978 | |
| GB | 2447689 A | * 9/2008 | ................ B60T 8/17 |

OTHER PUBLICATIONS

WIPO, Australian International Search Authority, International Search Report mailed May 25, 2012 in International Patent Application No. PCT/AU2012/000239, 5 pages.

(Continued)

*Primary Examiner* — John Q Nguyen
*Assistant Examiner* — Michael Whalen
(74) *Attorney, Agent, or Firm* — Inskeep IP Group, Inc.

(57) ABSTRACT

A system for substantially minimising sway of a towed vehicle, fitted with electric brakes, hitched to a towing vehicle, the system including an electric stability control (ESC) device adapted for mounting to a portion of the towed vehicle, the ESC device being operably connected to the electric brakes by cable means, the ESC including a sway detecting means for measuring lateral acceleration of the towed vehicle; an actuator means for activating the electric brakes of the towed vehicle, the actuator means being operatively connected to the sway detecting means whereby the sway detecting means activates the actuator means to apply a voltage to the brakes for a period of time when the sway detecting means detects a predetermined lateral acceleration of the towed vehicle relative to the towing vehicle. The system can also be used for controlling dangerous sway and instability of a towed vehicle.

22 Claims, 7 Drawing Sheets

(51) Int. Cl.
*B60D 1/30* (2006.01)
*B60D 1/62* (2006.01)
*B60T 8/17* (2006.01)
*B60T 8/1755* (2006.01)

(56) References Cited

U.S. PATENT DOCUMENTS

| | | | |
|---|---|---|---|
| 4,040,507 A | 8/1977 | Reise | |
| 7,731,302 B2 * | 6/2010 | Tandy et al. | 303/7 |
| 8,260,518 B2 * | 9/2012 | Englert | 701/72 |
| 8,571,777 B2 * | 10/2013 | Greene | 701/70 |
| 2002/0107627 A1 * | 8/2002 | Funke et al. | 701/70 |
| 2007/0193795 A1 * | 8/2007 | Forsyth | 180/65.4 |
| 2007/0260385 A1 * | 11/2007 | Tandy et al. | 701/70 |
| 2007/0260386 A1 * | 11/2007 | Tandy et al. | 701/70 |
| 2012/0041659 A1 * | 2/2012 | Greene | 701/70 |

OTHER PUBLICATIONS

WIPO, Australian International Search Authority, Written Opinion mailed May 25, 2012 in International Patent Application No. PCT/AU2012/000239, 8 pages.

* cited by examiner

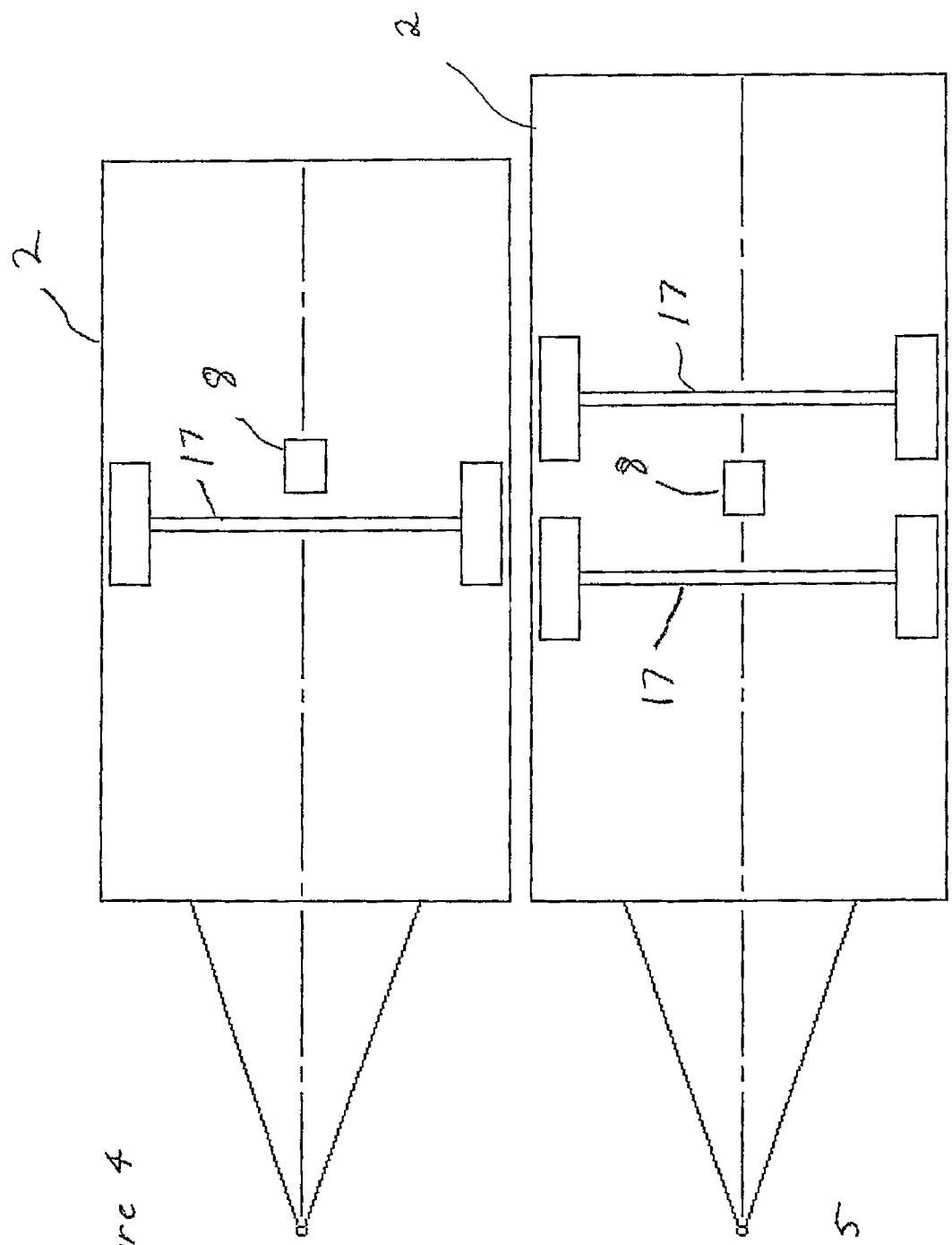

ELECTRIC STABILITY CONTROL SYSTEM AND DEVICE FOR CONTROLLING SWAY STABILITY OF A CARAVAN OR TRAILER AND THE LIKE

RELATED APPLICATIONS

This application claims priority to International Patent Application No. PCT/AU2012/000239, International Filing Date 8 Mar. 2012, entitled An Electric Stability Control System And Device For Controlling Sway Stability Of A Caravan Or Trailer And The Like, and to Australian Provisional Patent Application No. 2011900817 filed Mar. 8, 2011 entitled Sway Control For Trailers And The Like, and to Australian Provisional Patent Application No. 2011902032 filed May 25, 2011 entitled Sway Control For Trailers And The Like, all of which are hereby incorporated herein by reference in their entireties.

FIELD OF THE INVENTION

The present invention relates to a system and device for improving stability control of a towed vehicle such as a caravan or trailer or the like being towed by a towing vehicle such as a car, truck or the like. More particularly, the present invention relates to an electric stability control device which is adapted to control dangerous and excessive swaying of a towed vehicle independent of the towing vehicle, which could otherwise lead to complete loss of control.

BACKGROUND OF THE INVENTION

It is known that when a vehicle such as a caravan or camper trailer or the like is being towed by a towing vehicle such as a car or truck or the like, the towed vehicle has an inherent tendency to become unstable by swaying or fishtailing, which creates a hazardous condition for driving. The tendency of the towed vehicle to sway is initiated and amplified by uneven weight distribution and driving conditions including speed, braking, prevailing wind and rain, and even passing or being passed by other vehicles on the road.

There have been many reported accidents and roll-overs as a result of loss of control of the towing vehicle steering due to uncontrollable sway of the caravan or trailer. One way of trying to minimise swaying of a towed vehicle when towing, has been to use a friction sway control device. The sway control device includes a metal plate, on which is a small ball mount, that can be bolted onto the a frame or draw bar of a caravan or trailer. The hitch receiver can be modified by welding on a small ball mount for the other end of the sway control bar to attach. While this type of sway control device is practical for correcting minor sway of a towed vehicle by varying weight distribution when towing, further improvements or alternative means are required to address potential loss of control arising from dangerous and/or excessive sway.

National towing regulations exist in many jurisdictions now which make it mandatory for all towed vehicles such as caravans, camper trailers and the like with an aggregate trailer mass (including load) over 750 kg to have an effective braking system fitted. It is not unusual for caravans exceeding 1000 kgs to be fitted with electric brakes.

In order to operate electric trailer brakes, an electric brake controller is installed in the towing vehicle. In a towing condition, power is supplied from the towing vehicle battery to the electric brake controller, and the controller is also wired to the towing vehicle's stop light circuit through the towed vehicle's plug and socket. This allows the towed vehicle's brakes to come on automatically when the towing vehicle brakes are applied so that when a towing vehicle slows down under braking, the electric brakes on the caravan can be applied in proportion to reduce the effect of the (weight of the) caravan pushing the towing vehicle.

One problem with this is that while an electric brake controller can assist to minimise the effect of a towed vehicle mass on the operation of a towing vehicle under braking conditions, there is a need to provide a system which can operate the towed vehicle's brakes independent from the towing vehicle's brakes so as to manage an unstable conditions caused by swaying of the towed vehicle.

Some electric brake controllers have included a manual over ride systems which allow a driver to manually adjust the level of power to the electric brakes. One practical problem with this however is that a driver first has to identify an unstable towing condition and then operate the controller to apply an effective braking force. This has the potential to increase instability while braking, and in practice there is usually a delay which may allow an unstable condition to worsen.

While electric brake controllers have gone some way toward addressing problems associated with proportional pushing forces exerted by a towed vehicle on a towing vehicle during braking, there still remains the practical issues of swaying and oscillation caused by road conditions such as wind, slippery road surfaces or even pressure variations when passing another vehicle, which could have catastrophic consequences.

Further, electric brake controllers are usually fitted under a dash board element of a towing vehicle so as to be within reach of a driver. A problem with electric brake controllers is that most newly manufactured vehicles now include knee airbags to protect the knees of the driver, and the location of controllers will interfere with the normal operation of the knee airbag.

It is therefore an object of the present invention to address one or more of the foregoing problems. In particular an object of the invention is to provide an alternate device or system for improving sway stability of a towed vehicle when being towed substantially independently of the towing vehicle.

SUMMARY OF THE INVENTION

In the present invention there is disclosed a system for substantially minimising sway of a towed vehicle, fitted with electric brakes, hitched to a towing vehicle, the system including:
  an electric stability control (ESC) device adapted for mounting to a portion of the towed vehicle, the ESC device being operably connected to the electric brakes by cable means, the ESC including:
    a sway detecting means for measuring lateral acceleration of the towed vehicle;
    an actuator means for activating the electric brakes of the towed vehicle, the actuator means being operatively connected to the sway detecting means whereby the sway detecting means activates the actuator means to apply a voltage to the brakes for a period of time when the sway detecting means detects a predetermined lateral acceleration of the towed vehicle relative to the towing vehicle;
  a power source on the towing vehicle or towed vehicle interconnected to the ESC for providing power to the device;
  whereby the actuator means controls the electric brakes by providing an effective predetermined voltage input to the electric brakes dependent on the extent of swaying detected and towing load so that the towed vehicle can be substantially stabilised.

The system of the invention is found to improve on road stability of a towed vehicle compared to the prior art because any critical sway detected by the sway detecting means initiates actuation of the electric brakes of the towed vehicle independent of the towing vehicle to stabilise rate of sway where braking of the towing vehicle may in fact exacerbate sway acceleration. In particular, the system including the electric stability control device is able to detect dangerous incidents of sway and instability of the towed vehicle and by early intervention avoid a dangerous situation or preventing an accident.

The actuator means can be adapted for maintaining an effective voltage input to the electric brakes of the towed vehicle for a predetermined period after the sway detector means has determined rate of sway having returned to predetermined safe levels.

The actuator means can be configured for maintaining the effective voltage input to the electric brakes of the towed vehicle for a predetermined period after the sway detector means has determined rate of sway having returned to a predetermined safe level.

The amount of voltage output of the actuator means and the duration of braking can be varied dependent on a number of factors including the extent of lateral acceleration, i.e. high lateral acceleration will cause immediate activation of the brakes of the towed vehicle. Alternatively, if a small lateral sway is detected, the electric brakes will be activated when the extent of lateral acceleration is detected above a predetermined amount for a set number of cycles.

The actuator means can receive a signal input from the sway detecting means such that when the sway detecting means senses a predetermined lateral acceleration for about four (4) cycles, the sway detection means activates the actuator means.

When certain critical conditions of lateral acceleration are detected, the actuator means of the ESC transmits a voltage input to the electric brakes of the towed vehicle. The electric brakes are thus energised resulting in braking forces which tend to slow the towed vehicle having the effect of stopping sway movement of the towed vehicle and aligning the towing vehicle and the towed vehicle.

The ESC operates to activate the brakes in two situations. A large swerve causing high lateral acceleration of the towed vehicle activates the brakes immediately. A smaller swaying of the towed vehicle can activate the brakes if the lateral acceleration stays above a set amount for approximately 2 cycles.

In one embodiment, the actuator means is activated to apply a predetermined input voltage to the electric brakes when the sway detector means detects lateral acceleration exceeding about 0.4 g, wherein the actuator means can remain in an operating mode until the lateral acceleration detected by the sway detection means is reduced to about 0.15 g or less.

In a related embodiment, the actuator means is activated to apply a predetermined input voltage to the electric brakes when the sway detector means detects lateral acceleration exceeding about 0.2 g for two cycles, wherein the actuator means can remain in an operating mode until the lateral acceleration detected by the sway detection means is reduced to about 0.15 g or less.

The input voltage for controlling electric brakes of a towed vehicle (such as a caravan or trailer) can range between 4 to 12 volts depending on load, brake size, tyre radius and weight of towed vehicle. The actuator means can include optimal voltage input ranges for specific trailer/caravan weight as per the examples.

In a related aspect of the present invention there is disclosed an electric stability control device for controlling electric brakes of a towed vehicle so as to substantially minimise effects of lateral acceleration during a tow condition, the device including:
  a sway detecting means for measuring lateral acceleration of the towed vehicle;
  an actuator means connectable to the electric brakes for activating the electric brakes of the towed vehicle, the actuator means being operatively connected to the sway detecting means whereby the sway detecting means activates the actuator means when the sway detecting means detects a predetermined lateral acceleration of the towed vehicle;
  wherein in an operating condition, a power source is provided to power the ESC, and the actuator means provides an effective predetermined voltage input to the electric brakes dependent on the extent of swaying detected and towing load and for a period of time effective to substantially stabilise the towed vehicle independent of the towing vehicle.

The ESC device represents a significant improvement over the prior art because an unstable amount of sway of a towed vehicle, which could otherwise lead to a catastrophic event, can be detected early and substantially minimised by supplying a predetermined input voltage to the electric brakes for a period of time until lateral acceleration has returned to a predetermined safe level.

The actuator means can be configured for maintaining the effective voltage input to the electric brakes of the towed vehicle for a predetermined period after the sway detector means has determined rate of sway having returned to a predetermined safe level.

The actuator means is activated to apply a predetermined input voltage to the electric brakes when the sway detector means detects lateral acceleration exceeding about 0.4 g, wherein the actuator means can remain in an operating mode until the lateral acceleration detected by the sway detection means is reduced to about 0.15 g or less.

In a related embodiment, the actuator means is activated to apply a predetermined input voltage to the electric brakes when the sway detector means detects lateral acceleration exceeding about 0.2 g for two cycles, wherein the actuator means can remain in an operating mode until the lateral acceleration detected by the sway detection means is reduced to about 0.15 g or less.

In a related aspect, the present invention provides a sway control unit for a towed vehicle, the towed vehicle comprising electrically actuated brakes, the sway control unit:
  being mountable to the towed vehicle;
  comprising an accelerometer which is adapted to sense lateral acceleration of the towed vehicle; and
  operating to apply an actuating voltage to the electrically controlled brakes when the lateral acceleration of the towed vehicle meets specified, criteria, the actuating voltage being:
    where the towed vehicle is a single axle vehicle with brakes substantially 10 inches in diameter and having brake pads substantially 2.25 inches wide:
      in the range of 4 volts to 6 volts for a load between 500 kg and 750 kg;
      in the range of 5 volts to 7 volts for a load between 750 kg and 1,000 kg; and in the range of 6 volts to 8 volts for a load between 1000 kg to 1250 kg; and in the range of 8 to 10 volts for a load between 1250 kg and 1750 kg; and where the towed vehicle is a tandem axle vehicle with brakes substantially 10 inches in diameter and having brake pads substantially 2.25 inches wide:

in the range of 8 volts to 10 volts for a load between 1,500 kg and 2,000 kg; and in the range of 10 volts to 12 volts for a load between 2,000 kg and 2,500 kg; and where the towed vehicle is a single axle vehicle with brakes substantially 12 inches in diameter and having brake pads substantially 52 mm inches wide:

in the range of 6 to 8 volts for a load between 1500 kg and 1750 kg;

in the range of 7 to 9 volts for a load between 1750 kg and 2000 kg;

in the range of 8 to 10 volts for a load between 2000 kg and 2250 kg; and in the range of 9 to 11 volts for a load between 2250 kg and 2500 kg.

It is preferred that the actuating voltage is:

where the towed vehicle is a single axle vehicle with brakes substantially 10 inches in diameter and having brake pads substantially 2.25 inches wide:

in the range of 4.5 to 5.5 volts for a load between 500 kg and 750 kg;

in the range of 5.5 to 6.5 volts for a load between 750 kg and 1,000 kg; and in the range of 6.5 to 7.5 volts for a load between 1000 kg to 1250 kg; and in the range of 8.5 to 9.5 volts for a load between 1250 kg and 1750 kg; and where the towed vehicle is a tandem axle vehicle with brakes substantially 10 inches in diameter and having brake pads substantially 2.25 inches wide:

in the range of 8.5 to 9.5 volts for a load between 1,500 kg and 2,000 kg; and in the range of 10.5 volts to 11.5 volts for a load between 2,000 kg and 2,500 kg;

where the towed vehicle is a single axle vehicle with brakes substantially 12 inches in diameter and having brake pads substantially 52 mm inches wide:

in the range of 6.5 to 7.5 volts for a load between 1500 kg and 1750 kg;

in the range of 7.5 to 8.5 volts for a load between 1750 kg and 2000 kg;

in the range of 8.5 to 9.5 volts for a load between 2000 kg and 2250 kg; and in the range of 9.5 to 10.5 volts for a load between 2250 kg and 2500 kg.

It is preferred that the actuating voltage is:

where the towed vehicle is a single axle vehicle with brakes substantially 10 inches in diameter and having brake pads substantially 2.25 inches wide:

5 volts for a load between 500 kg and 750 kg;

6 volts for a load between 750 kg and 1,000 kg;

7 volts for a load between 1000 kg to 1250 kg;

9 volts for a load between 1250 kg and 1750 kg; and where the towed vehicle is a tandem axle vehicle with brakes substantially 10 inches in diameter and having brake pads substantially 2.25 inches wide:

9 volts for a load between 1,500 kg and 2,000 kg; and 11 volts for a load between 2,000 kg and 2,500 kg.

where the towed vehicle is a single axle vehicle with brakes substantially 12 inches in diameter and having brake pads substantially 52 mm inches wide:

7 volts for a load between 1500 kg and 1750 kg;

8 volts for a load between 1750 kg and 2000 kg;

9 volts for a load between 2000 kg and 2250 kg; and 10 volts for a load between 2250 kg and 2500 kg.

BRIEF DESCRIPTION OF THE DRAWINGS

For a better understanding of the invention, and to show how it may be carried into effect, embodiments of it are shown, by way of non-limiting example only, in the accompanying drawings. In the drawings:

FIG. 4 is a plan view, showing hidden detail, of an embodiment of the present invention;

FIG. 5 is a plan view, showing hidden detail, of an embodiment of the present invention;

DESCRIPTION OF PREFERRED EMBODIMENTS OF THE INVENTION

Construction

Figure 6:
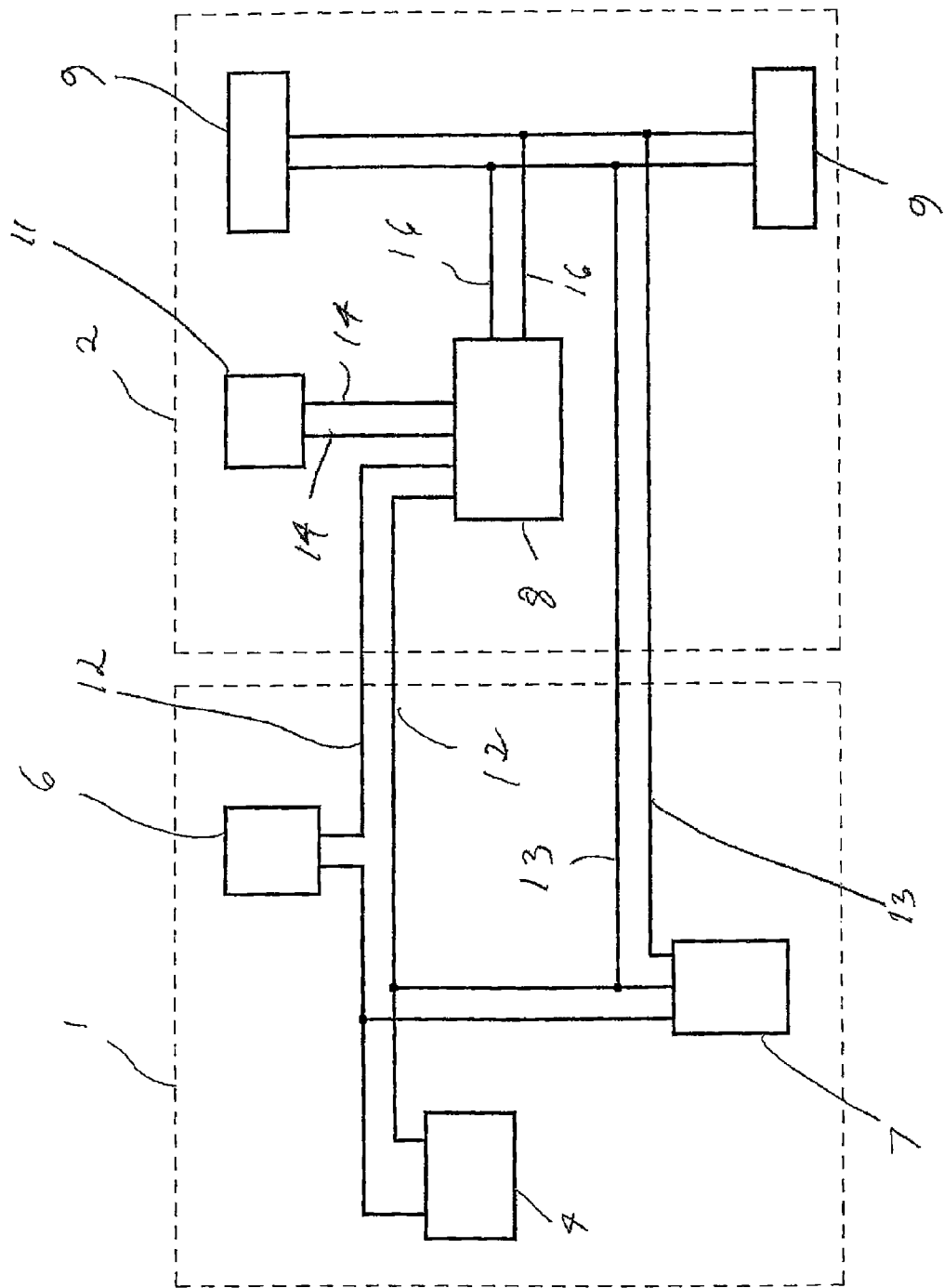
FIG. 6 is a schematic representation of apparatus according to an embodiment of the present invention.

FIG. 6 illustrates apparatus according to a preferred embodiment of the present invention. In FIG. 6, a towing vehicle is represented at 1 and a towed vehicle is represented at 2. The towing vehicle and the towed vehicle are joined by a tow-bar which is not illustrated in the drawing.

The towing vehicle 1 comprises a battery 4, an ignition switch 6 and an electric brake controller 7. The towed vehicle 4 comprises an electric sway control (ESC) unit 8, electric brakes 9 and a LED-light 11. Power cables 12 supply power from the battery 4 to the ESC unit 8 through cables which join through a connector (which is not illustrated in the drawings) at the tow-bar. The electric brake controller 7 in the towing vehicle 1 is connected to the electric brakes 9 in the towed vehicle 2 by electric cables 13.

The ESC unit 8 comprises a circuit board mounted in a plastic box which is centrally mounted under the towed vehicle. A LED-light 11 is mounted on the drawbar and is connected by cables 14 to the ESC unit 8. An accelerometer (which is not illustrated in the drawings) is also mounted within the ESC unit 8. In the case of a single axle towed vehicle, the ESC unit 8 is mounted directly behind the axle 17 so that the accelerometer is approximately 100 mm from the longitudinal axis of the axle. FIG. 5 illustrates an alternative preferred form of the invention, in which the towed vehicle has tandem axles 17. In the case of such a tandem-axle towed vehicle, the ESC unit 8 is mounted so that the accelerometer is approximately equidistant between the two axles 17.

Operation

The application of the brakes of the towing vehicle 1 by the driver in the normal course of driving operates the electric brake controller 7, which in turn operates to energize the electric brakes 9 on the towed vehicle 2.

Figure 1:
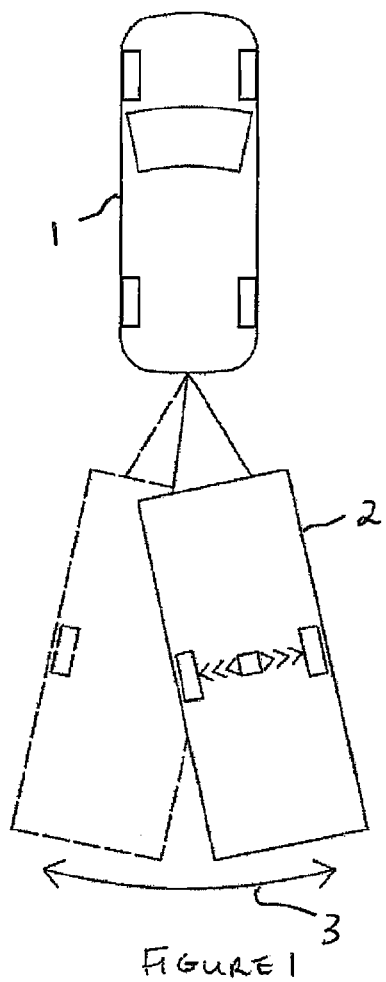
FIG. 1 is a plan view illustrating the problem of sway of a towed vehicle.
Figure 3:
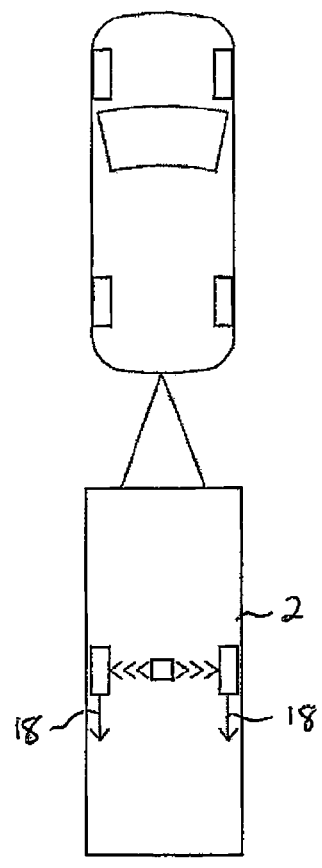
FIG. 3 illustrates an aspect of operation of an embodiment of the present invention.
Figure 9:
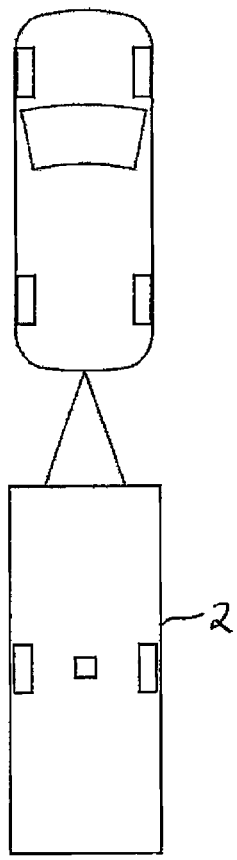
FIG. 9 illustrates an aspect of operation of an embodiment of the present invention.

The ESC unit 8 uses the output of the accelerometer to constantly measure the lateral (that is, side-to-side) acceleration of the towed vehicle 2 at a frequency of 100 Hz. When certain critical conditions (described below) of lateral acceleration are detected, the ESC unit 8 energizes the electric brakes 9 of the towed vehicle. As is illustrated in FIG. 3, the energization of the brakes 9 result in braking forces 18 which tend to slow the towed vehicle 2 independently of the towing vehicle 1. As is illustrated in FIG. 9, this braking of the towed vehicle 2, independently of the towing vehicle 1, has the effect of stopping sway movement of the towed vehicle 2 and aligning the towing vehicle and the towed vehicle. The ESC unit 8 operates automatically to operate the brakes 9 enough to provide firm braking without skidding. The brakes are applied until the ESC unit 8 detects that the sway is no longer critical.

The ESC unit 8 operates to activate the brakes 9 in two types of situation. A large swerve causing high lateral acceleration of the towed vehicle 2 will cause the ESC unit 8 to activate the brakes 9 immediately. A smaller swaying of the towed vehicle 2 will cause the ESC unit 8 to activate the brakes 9 if the lateral acceleration stays above a set amount for approximately 4 cycles. In both situations the ESC unit 8 continues to apply the brakes of the towed vehicle and holds them on for a short period after the lateral acceleration has returned to a safe level. When ESC unit 8 activates, the driver will feel the vehicle being slowed down by the soft braking of the towed vehicle.

Figure 7:
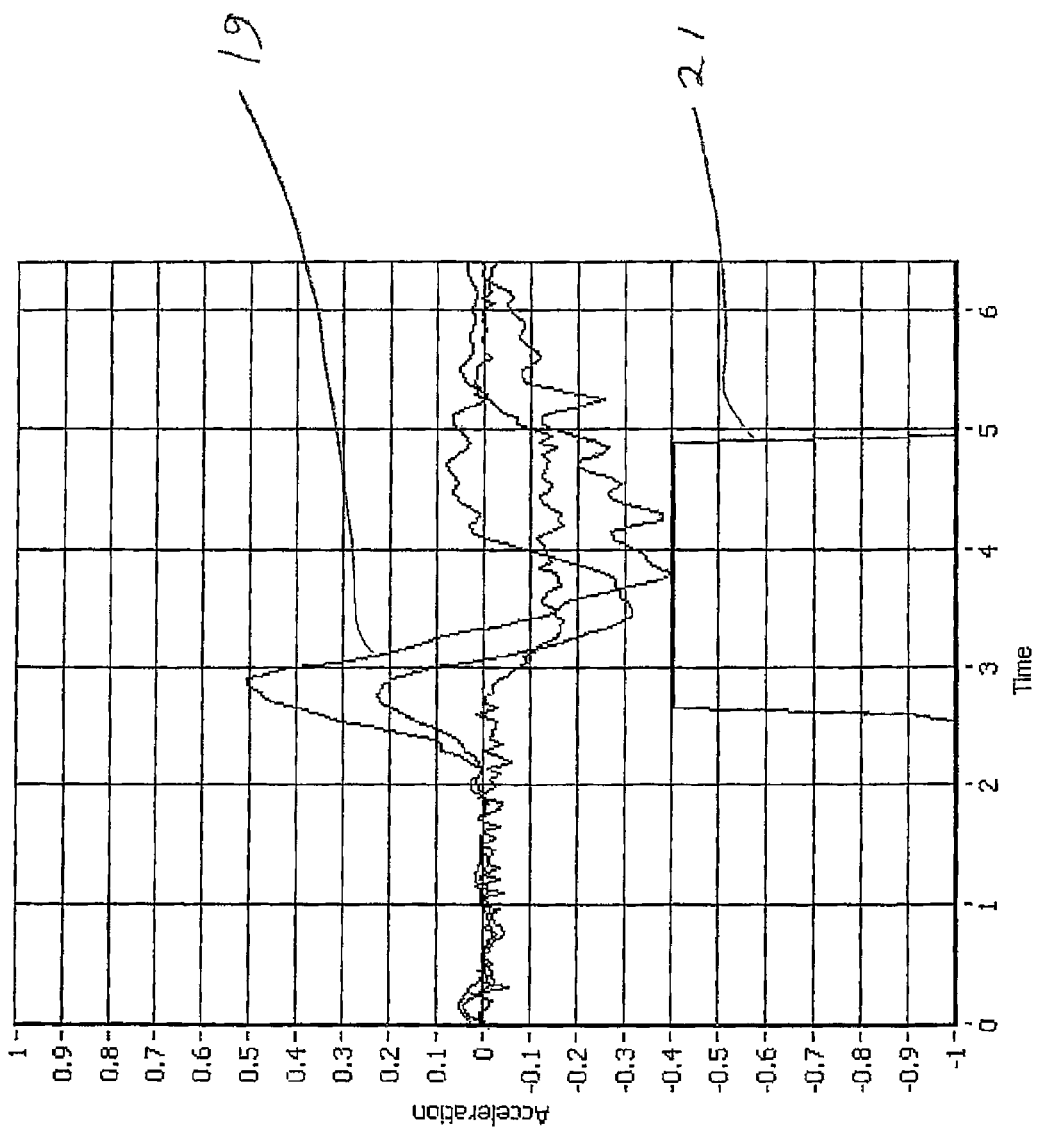
FIG. 7 is a graph illustrating an aspect of the operation of an embodiment of the present invention.

As is illustrated in FIG. 7, when lateral acceleration 19 exceeds about 0.4 g then braking force 21 is applied by the brakes 9 under control of the ESC unit 8 until lateral acceleration reduces to 0.15 g or less.

Braking force 21 is also applied by the brakes 9 under the control of the ESC unit where lateral acceleration exceeds 0.2 g for 2 cycles, and the brakes 9 are held on until lateral acceleration reduces to 0.15 g or less.

The LED light provides feedback of the current status of the ESC unit 8 and warns of any errors that may have occurred.

| LED Display | Condition | What to Do |
|---|---|---|
| Green | Active | |
| Green Flashing | Active Self start up test incomplete | Drive forward so that the ESC unit detects movement, the start up test should complete and the light will change to constant green. |
| Red | Inactive | Check the connectors and reconnect. If the light remains red the number of errors detected has exceeded the allowable number set. The caravan is safe to tow but the ESC unit is inactive and should be analysed using the software and reset. |
| Red Flashing | Fault detected | Check the connectors and reconnect. If LED continues to flash red, disconnect the ESC unit before driving. The ESC unit requires analysis and repair. |
| LED not working | No power or LED faulty | Check the power supply, connectors and reconnect. Replace LED if required. |

Calibration with 10-Inch Brakes

Figure 2:
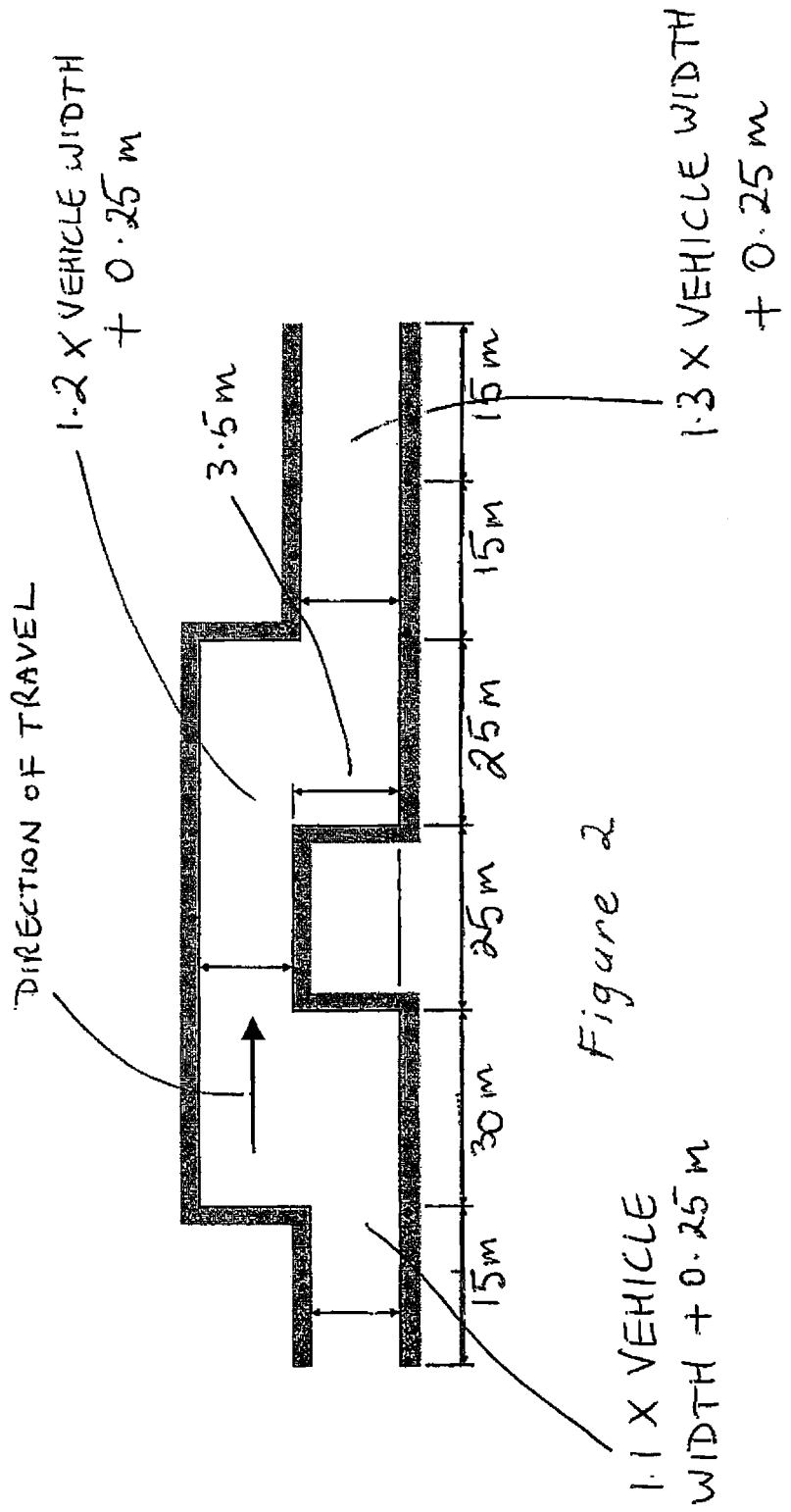
FIG. 2 is standard ISO swerve and recovery track (ISO standard number 3888)

Testing was carried out on a standard ISO swerve and recovery track such as is illustrated in FIG. 2. In this testing, the towed vehicles were caravans of various weight, suspension type and wheel size. The purpose of this testing was to determine the suitable input voltage to the brakes 9 over a representative complete range of caravans. This testing was also conducted on a wet surface to ensure that the settings would be suitable in all conditions for each weight range.

ESC units 8 were fitted to two single axle caravans and a tandem axle caravan then swerve tested at various loads to determine the acceptable voltage setting for each weight. The caravans were loaded to the weight required then tested for a range of voltage settings. Single axle caravans were tested from 1000 kg to 1750 kg in 250 kg steps. The tandem axle caravan was tested from 1600 kg to 2500 kg.

After initial trials it was determined that the vehicle speed did not dramatically affect the response or effectiveness of the ESC unit 8. The tow vehicle and caravan entered the course at 80 km/hr for each test. After the dry track testing had been completed, the tests were repeated on a wet surface. The track was watered down and remained wet from soaker hoses which were left running along the side of the test track.

The tandem axle caravan was towed by a Mitsubishi Pajero 4WD. A 960 kg single axle caravan was towed by a Mercedes 380 sedan. A 1750 kg single axle caravan was towed by both a Holden Commodore sedan and a Mitsubishi Pajero.

Each caravan was fitted with new tyres which were inflated to the pressure recommended by the manufacturer for the load and with new 10-inch electric brakes. (That is, the brakes were 10-inch diameter and had brake pads of 2.25 inches wide.) The caravans were loaded with sandbags to achieve the required weight for each test. Care was taken to locate the weight from the sandbags centrally over the axles.

The location of the ESC unit 8 when mounted to the underside of a caravan/trailer was also tested and evaluated.

Figure 8:
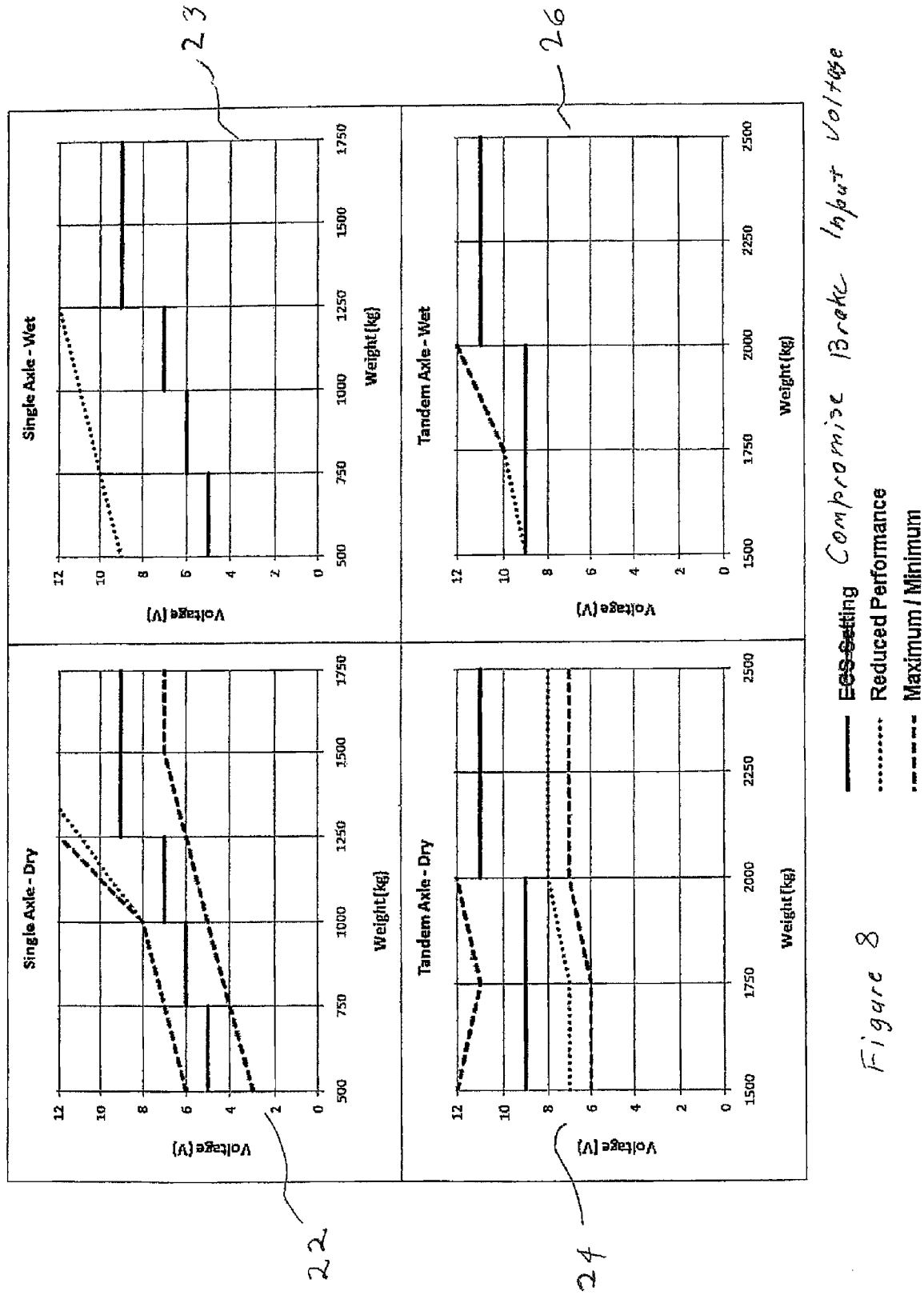
FIGS. 8 and 10 are a set of graphs which summarize test and other data.
Figure 10:
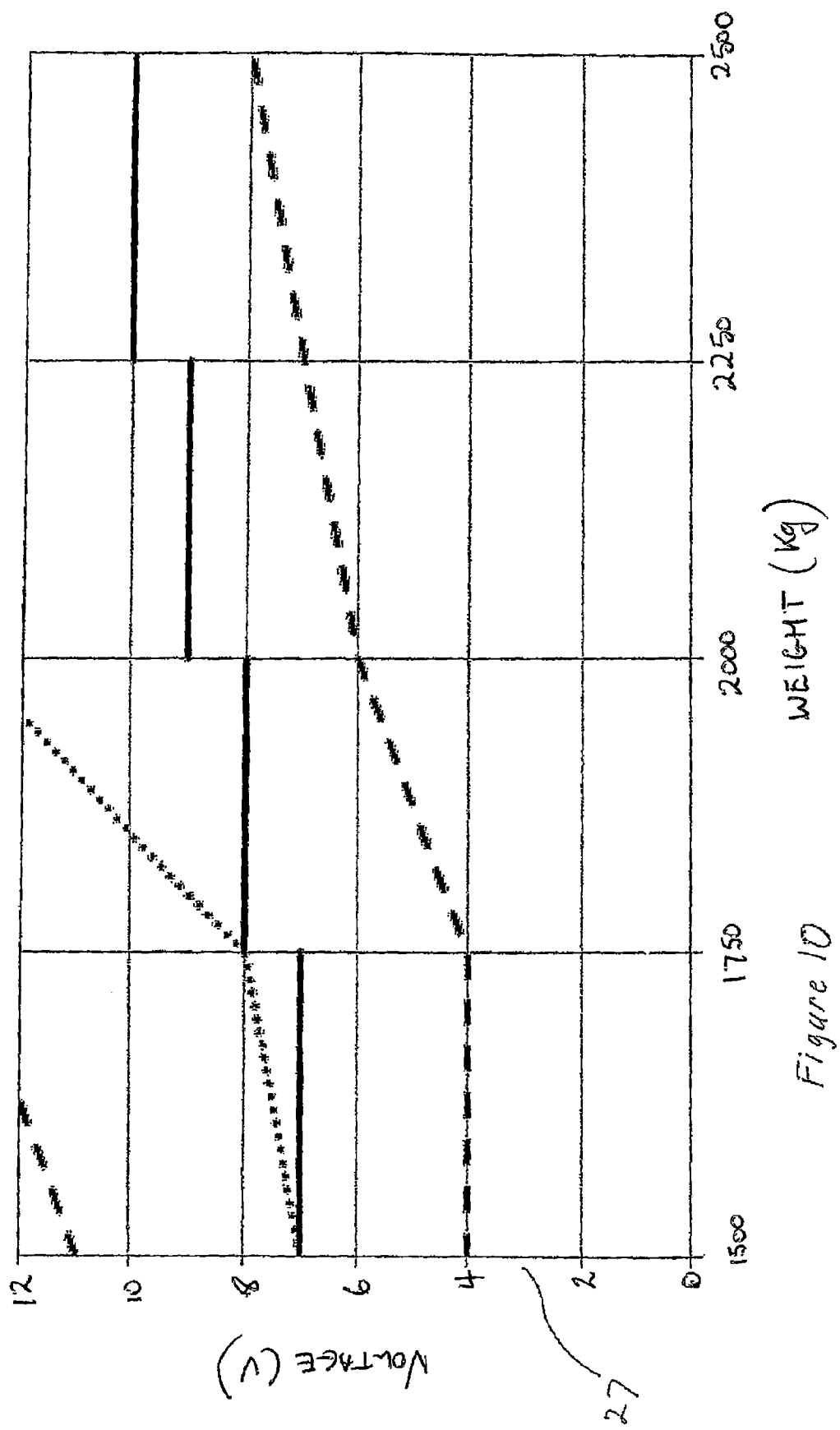

FIG. 8 summarizes the results of testing, and also illustrates extrapolation of the test data.

The graph 22 illustrates the performance of a single axle caravan in dry conditions and the graph 23 illustrates the performance of a single axle caravan in wet conditions. From this observed performance, it is concluded that for a single axle towed vehicle, of a weight from 1250 kg to 1750 kg, in either dry or wet conditions, a 9-volt input to the electric brakes would be selected for commercial products. It is similarly concluded that for a single axle towed vehicle, of a weight from 1000 kg to 1250 kg, in either dry or wet conditions, a 7-volt input to the electric brakes would be selected for commercial products. From these conclusions, it is extrapolated that, in wet or dry conditions, the following voltage settings could be used for a single axle vehicle:

in the range of 4 volts to 6 volts for a load between 500 kg and 750 kg;
in the range of 5 volts to 7 volts for a load between 750 kg and 1,000 kg;
in the range of 6 volts to 8 volts for a load between 1000 kg to 1250 kg; and
in the range of 8 to 10 volts for a load between 1250 kg and 1750 kg.

The graph 24 illustrates performance of a tandem axle caravan in dry conditions and the graph 26 illustrates the performance of a tandem axle caravan in wet conditions. (The figures relating to weights in the range 1,600 kg to 2,500 kg were determined by trial, the figures for weights from 1,500 kg to 1,600 kg were determined by extrapolation.) It is concluded that, for a tandem axle towed load, in wet or dry conditions, the following voltage settings could be used:

in the range of 8 volts to 10 volts for a load between 1,500 kg and 2,000 kg; and
in the range of 10 volts to 12 volts for a load between 2,000 kg and 2,500 kg.

Calibration with 12-Inch Brakes

Testing was similarly carried out on single axle caravans which were fitted with 12-inch brakes. (That is, the brakes were 12-inch in diameter and had brake pades of 52 mm wide.) The results of the testing are illustrated in FIG. 9. From that testing, it is extrapolated that, in wet or dry conditions, the following voltage settings could be used:

in the range of 6 to 8 volts for a load between 1500 kg and 1750 kg;
in the range of 7 to 9 volts for a load between 1750 kg and 2000 kg;
in the range of 8 to 10 volts for a load between 2000 kg and 2250 kg; and
in the range of 9 to 11 volts for a load between 2250 kg and 2500 kg While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Throughout this specification, the words "comprise", "comprising", and "comprises" are to be taken to specify the presence of stated features, integers, steps or components but does not preclude the presence or addition of one or more other features, integers, steps, components or groups thereof.

In the claims, each dependent claim is to be read as being within the scope of its parent claim or claims, in the sense that a dependent claim is not to be interpreted as infringed unless its parent claims are also infringed.

The claims defining the invention are as follows:

1. A system for substantially stabilizing dangerous and excessive sway of a towed vehicle, fitted with electric brakes, hitched to a towing vehicle, the system including:
   an electric stability control (ESC) device adapted for mounting to a portion of the towed vehicle, the ESC device being operably connected to the electric brakes by cable, the ESC including:
      a sway detector for measuring lateral acceleration of the towed, vehicle;
      an actuator for activating the electric brakes of the towed vehicle, the actuator being operatively connected to the sway detector wherein the sway detector activates the actuator to apply a voltage to the brakes for a period of time when the sway detecting detects a predetermined critical condition of lateral acceleration of the towed vehicle relative to the towing vehicle;
      a power source on the towing vehicle or towed vehicle interconnected to the ESC for providing power to the device;
   the actuator controlling the electric brakes by providing an effective predetermined voltage input to the electric brakes dependent on the extent of swaying detected and towing load so that the towed vehicle can be substantially stabilized;
   wherein the predetermined critical conditions that the sway detector detects include:
      detecting a predetermined lateral acceleration of the towed vehicle relative to the towing vehicle of about 0.15 g to 0.2 g over two (2) cycles;
      or detecting lateral acceleration in a cycle exceeding about 0.4 g.

2. The system of claim 1 wherein the actuator is adapted for maintaining an effective voltage input to the electric brakes of the towed vehicle for a predetermined period after the sway detector has determined rate of sway having returned to predetermined safe levels.

3. The system of claim 1 wherein the actuator is configured for maintaining the effective voltage input to the electric brakes of the towed vehicle for a predetermined period after the sway detector has determined rate of sway having returned to a predetermined safe level.

4. The system of claim 1 wherein the amount of voltage output of the actuator and the duration of braking can be varied based on a level of lateral acceleration.

5. The system of claim 1 wherein the actuator is activated to apply a predetermined input voltage to the electric brakes when the sway detector detects lateral acceleration exceeding about 0.4 g, wherein the actuator can remain in an operating mode until the lateral acceleration detected by the sway detector is reduced to about 0.15 g or less.

6. The system of claim 1 wherein the actuator is activated to apply a predetermined input voltage to the electric brakes when the sway detector detects lateral acceleration exceeding about 0.2 g for two cycles, wherein the actuator remains in an operating mode until the lateral acceleration detected by the sway detector is reduced to about 0.15 g or less.

7. The system of claim 1 wherein the input voltage for controlling electric brakes of a towed vehicle is between 4 to 12 volts and is determined by load, brake size, tire radius and weight of towed vehicle.

8. An electric stability control device for controlling electric brakes of a towed vehicle so as to substantially minimize effects of lateral acceleration during a tow condition, the device including;
   a sway detector for measuring lateral acceleration of the towed vehicle;
   an actuator connectable to the electric brakes for activating the electric brakes of the towed vehicle, the actuator being operatively connected to the sway detector wherein the sway detector detects a predetermined critical condition of lateral acceleration of the towed vehicle relative to a towing vehicle, wherein the predetermined critical conditions that the sway detector detects include:
      detecting a predetermined lateral acceleration of the towed vehicle relative to the towing vehicle of about 0.15 g to 0.2 g over two (2) cycles;
      or detecting lateral acceleration in a cycle exceeding about 0.4 g;
   wherein in an operating condition, a power source is provided to power the electrical stability control, and the actuator provides an effective predetermined voltage input to the electric brakes when one of the certain critical conditions of lateral acceleration are detected based on the extent of swaying detected and towing load and for a period of time effective to substantially stabilize the towed vehicle independent of the towing vehicle.

9. The electric stability control device for controlling electric brakes of a towed vehicle of claim 8 wherein the actuator can be configured for maintaining the effective voltage input to the electric brakes of the towed vehicle for a predetermined period after the sway detector has determined rate of sway having returned to a predetermined safe level.

10. The electric stability control device for controlling electric brakes of a towed vehicle of claim 8 wherein the actuator is activated to apply a predetermined input voltage to the electric brakes when the sway detector detects lateral acceleration exceeding about 0.4 g, wherein the actuator remains in an operating mode until the lateral acceleration detected by the sway detector is reduced to about 0.15 g or less.

11. The electric stability control device for controlling electric brakes of a towed vehicle of claim 8 wherein the actuator is activated to apply a predetermined input voltage to the electric brakes when the sway detector detects lateral acceleration exceeding about 0.2 g for two cycles, wherein the actuator can remain in an operating mode until the lateral acceleration detected by the sway detector is reduced to about 0.15 g or less.

12. A sway control unit for a towed vehicle having electrically actuated brakes, the electronic sway control unit:
being mountable to the towed vehicle;
comprising an accelerometer which is adapted to sense lateral acceleration of the towed vehicle; and
operating to apply an actuating voltage to the electrically controlled brakes when the lateral acceleration of the towed vehicle meets specified criteria;
wherein said specified criteria includes:
detecting a predetermined lateral acceleration of the towed vehicle relative to the towing vehicle of about 0.15 g to 0.2 g over two (2) cycles;
or detecting lateral acceleration in a cycle exceeding about 0.4 g.

13. The sway control unit of claim 12 wherein the towed vehicle is a single axle vehicle with brakes substantially 10 inches in diameter and having brake pads substantially 2.25 inches wide and the actuating voltage is:
in the range of 4 volts to 6 volts for a load between 500 kg and 750 kg;
in the range of 5 volts to 7 volts for a load between 750 kg and 1,000 kg;
in the range of 6 volts to 8 volts for a load between 1000 kg to 1250 kg; and
in the range of 8 to 10 volts for a load between 1250 kg and 1750 kg.

14. The sway control unit of claim 12 wherein the towed vehicle is a tandem axle vehicle with brakes substantially 10 inches in diameter and having brake pads substantially 2.25 inches wide and the actuating voltage is:
in the range of 8 volts to 10 volts for a load between 1,500 kg and 2,000 kg; and
in the range of 10 volts to 12 volts for a load between 2,000 kg and 2,500 kg.

15. The sway control unit of claim 12 wherein the towed vehicle is a single axle vehicle with brakes substantially 12 inches in diameter and having brake pads substantially 52 mm inches wide and the actuating voltage is:
in the range of 6 to 8 volts for a load between 1500 kg and 1750 kg;
in the range of 7 to 9 volts for a load between 1750 kg and 2000 kg;
in the range of 8 to 10 volts for a load between 2000 kg and 2250 kg;and
in the range of 9 to 11 volts for a load between 2250 kg and 2500 kg.

16. The sway control unit for a towed vehicle of claim 12 wherein the towed vehicle is a single axle vehicle with brakes substantially 10 inches in diameter and having brake pads substantially 2.25 inches wide and the actuating voltage is:
in the range of 4.5 to 5.5 volts for a load between 500 kg and 750 kg;
in the range of 5.5 to 6.5 volts for a load between 750 kg and 1,000 kg;
in the range of 6.5 to 7.5 volts for a load between 1000 kg to 1250 kg; and
in the range of 8.5 to 9.5 volts for a load between 1250 kg and 1750 kg.

17. The sway control unit for a towed vehicle of claim 12 wherein the towed vehicle is a tandem axle vehicle with brakes substantially 10 inches in diameter and having brake pads substantially 2.25 inches wide and the actuating voltage is:
in the range of 8.5 to 9.5 volts for a load between 1,500 kg and 2,000 kg; and
in the range of 10.5 volts to 11.5 volts for a load between 2,000 kg and 2,500 kg.

18. The sway control unit for a towed vehicle of claim 12 wherein the towed vehicle is a single axle vehicle with brakes substantially 12 inches in diameter and having brake pads substantially 52 mm inches wide:
in the range of 6.5 to 7.5 volts for a load between 1500 kg and 1750 kg;
in the range of 7.5 to 8.5 volts for a load between 1750 kg and 2000 kg;
in the range of 8.5 to 9.5 volts for a load between 2000 kg and 2250 kg; and
in the range of 9.5 to 10.5 volts for a load between 2250 kg and 2500 kg.

19. The sway control unit for a towed vehicle of claim 12 wherein the towed vehicle is a single axle vehicle with brakes substantially 10 inches in diameter and having brake pads substantially 2.25 inches wide and the actuating voltage is:
5 volts for a load between 500 kg and 750 kg;
6 volts for a load between 750 kg and 1,000 kg;
7 volts for a load between 1000 kg to 1250 kg; and
9 volts for a load between 1250 kg and 1750 kg.

20. The sway control unit for a towed vehicle of claim 12 wherein the towed vehicle is a tandem axle vehicle with brakes substantially 10 inches in diameter and having brake pads substantially 2.25 inches wide and the actuating voltage is:
9 volts for a load between 1,500 kg and 2,000 kg; and
11 volts for a load between 2,000 kg and 2,500 kg.

21. The sway control unit for a towed vehicle of claim 12 wherein the towed vehicle is a single axle vehicle with brakes substantially 12 inches in diameter and having brake pads substantially 52 mm inches wide and the actuating voltage is:
7 volts for a load between 1500 kg and 1750 kg;
8 volts for a load between 1750 kg and 2000 kg;
9 volts for a load between 2000 kg and 2250 kg; and
10 volts for a load between 2250 kg and 2500 kg.

22. An electric stability control device for controlling electric brakes of a towed vehicle so as to substantially minimize effects of lateral acceleration during as tow condition, the device including:
a sway detecting means for measuring lateral acceleration of the towed vehicle;
an actuator means for activating the electric brakes of the towed vehicle, the actuator means being operatively connected to the sway detecting means whereby the sway detecting means detects certain critical conditions of lateral acceleration including:
detecting a predetermined lateral acceleration of the towed vehicle relative to the towing vehicle over two (2) cycles; and
detecting lateral acceleration exceeding about 0.4 g
wherein when the sway detecting means detects lateral acceleration exceeding about 0.2 g for two cycles, the actuator means is activated to apply a predetermined input voltage to the electric brakes until the lateral acceleration detected by the sway detecting means is reduced to about 0.15 g or less; and
wherein when the sway detecting means detects lateral acceleration exceeding about 0.4 g, the actuator means is activated to apply a predetermined input voltage to the electric brakes until the lateral acceleration detected by the sway detecting means is reduced to about 0.15 g or less.

* * * * *